(12) United States Patent  
Yang

(10) Patent No.: US 12,323,635 B2
(45) Date of Patent: Jun. 3, 2025

(54) IMAGE PROCESSING METHOD AND APPARATUS

(71) Applicant: BEIJING BYTEDANCE NETWORK TECHNOLOGY CO., LTD., Beijing (CN)

(72) Inventor: Qingshuai Yang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 365 days.

(21) Appl. No.: 17/761,173

(22) PCT Filed: Aug. 20, 2020

(86) PCT No.: PCT/CN2020/110182
§ 371 (c)(1),
(2) Date: Mar. 16, 2022

(87) PCT Pub. No.: WO2021/052095
PCT Pub. Date: Mar. 25, 2021

(65) Prior Publication Data
US 2023/0300385 A1   Sep. 21, 2023

(30) Foreign Application Priority Data

Sep. 17, 2019 (CN) .......................... 201910876526.9

(51) Int. Cl.
*H04N 5/445* (2011.01)
*H04N 21/218* (2011.01)
(Continued)

(52) U.S. Cl.
CPC ... *H04N 21/2181* (2013.01); *H04N 21/23412* (2013.01); *H04N 21/23418* (2013.01); *H04N 21/41407* (2013.01)

(58) Field of Classification Search
CPC ......... H04N 21/2181; H04N 21/23412; H04N 21/23418; H04N 21/41407;
(Continued)

(56) References Cited

U.S. PATENT DOCUMENTS 10,795,527 B1 *   10/2020 Legge .................. G06F 3/0482
2007/0200953 A1 *   8/2007 Liu ..................... H04N 21/4728
348/561
(Continued)

FOREIGN PATENT DOCUMENTS

CN    101101505 A    1/2008
CN    103530594 A    1/2014
(Continued)

OTHER PUBLICATIONS

International Patent Application No. PCT/CN2020/110182; Int'l Search Report; dated Nov. 13, 2020; 2 pages.
(Continued)

*Primary Examiner* — Jefferey F Harold
*Assistant Examiner* — Sahar Aqil Riaz
(74) *Attorney, Agent, or Firm* — BakerHostetler

(57) ABSTRACT

An image processing method, an image processing apparatus, an electronic device, and a computer-readable storage medium are provided. In the method, a video image is acquired, where the video image includes a two-dimensional sticker, and the two-dimensional sticker includes a target area, by performing key point detection on the video image, a preset number of first key points associated with the target area in the two-dimensional sticker are acquired. The preset number of second key points that are marked and associated with the target area are acquired. A display area of the two-dimensional sticker in the video image is determined according to the preset number of the first key points and the
(Continued)

preset number of the second key points, and the two-dimensional sticker is rendered in the display area.

18 Claims, 4 Drawing Sheets

(51) Int. Cl.
  *H04N 21/234* (2011.01)
  *H04N 21/414* (2011.01)
(58) Field of Classification Search
  CPC ..... H04N 21/234345; H04N 21/47205; H04N 21/8146; H04N 21/44; G06T 11/60
  USPC ......................................................... 725/37
  See application file for complete search history.

(56) References Cited

U.S. PATENT DOCUMENTS

| | | | | |
|---|---|---|---|---|
| 2009/0295791 | A1* | 12/2009 | Aguera y Arcas | ... G06T 15/205 345/419 |
| 2014/0085293 | A1* | 3/2014 | Konoplev | ............... A63F 13/55 345/419 |
| 2018/0108165 | A1* | 4/2018 | Shi | ......................... G06N 3/084 |
| 2019/0096113 | A1* | 3/2019 | Stukalov | ................. G06T 11/60 |
| 2019/0129597 | A1* | 5/2019 | Lewis | .................. G11B 27/105 |
| 2019/0392202 | A1* | 12/2019 | Hong | .................. G06V 10/806 |
| 2020/0125100 | A1* | 4/2020 | Wu | ......................... G05D 1/101 |
| 2020/0236276 | A1* | 7/2020 | Wu | ....................... H04N 23/951 |
| 2020/0372692 | A1* | 11/2020 | Ge | ....................... G06V 40/165 |
| 2021/0366163 | A1* | 11/2021 | Lin | ......................... G06T 11/00 |

FOREIGN PATENT DOCUMENTS

| | | |
|---|---|---|
| CN | 107679497 A | 2/2018 |
| CN | 107770602 A | 3/2018 |
| CN | 107770603 A | 3/2018 |
| CN | 108876713 A | 11/2018 |
| CN | 109522910 A | 3/2019 |
| CN | 109819316 A | 5/2019 |

OTHER PUBLICATIONS

"LU decomposition method and solution method of special equations"; https://wenku.baidu.com/view/da591623aaea998fcc220e83.html?_wkts_=1715780149514&bdQuery=lu%E5%88%86%E8%A7%A3%E6%B1%82%E8%A7%A3%E6%96%B9%E7%A8%8B%E7%BB%84+%E7%99%BE%E5%BA%A6%E6%96%87%E5%BA%93&needWelco93&needWelcomememeRecommand=1; Baidu; Dec. 2010; 37 pages (contains English Translation).
Rejection Decision for Chinese Application No. 201910876526.9, mailed Oct. 28, 2024, 14 pages.
Written Opinion for International Application No. PCT/CN2020/110182, mailed Nov. 13, 2020, 7 Pages.

* cited by examiner

IMAGE PROCESSING METHOD AND APPARATUS

REFERENCE TO RELATED APPLICATION

The present application is the national phase of International Patent Application No. PCT/CN2020/110182, titled "IMAGE PROCESSING METHOD AND APPARATUS", filed on Aug. 20, 2020, which claims priority to Chinese Patent Application No. 201910876526.9, titled "IMAGE PROCESSING METHOD AND APPARATUS", filed on Sep. 17, 2019, both of which are incorporated herein by reference in their entireties.

FIELD

The present disclosure relates to the field of image processing, and in particular to an image processing method, an image processing apparatus, and a computer readable storage medium.

BACKGROUND

With the continuous development of the Internet and computer technology, various terminal applications are developed. Some applications in the terminal, especially video applications, are the mostly used applications for entertainment. In some application scenarios, special effects are usually added to videos to enhance the interactive effect. For example, some interesting stickers may be attached.

In the conventional technology, a two-dimensional sticker is usually attached to a video by scaling the two-dimensional sticker to a fixed area in the video for display. This sticker display method causes inflexible video images and unintelligent human-computer interaction.

SUMMARY

This summary is provided to introduce the idea in a simplified form. The idea will be described in detail in the following description. This summary is neither intended to identify key features or essential features of the claimed technical solution, nor intended to be used to limit the scope of the claimed technical solution.

The technical problem solved by the present disclosure is to provide an image processing method, so as to at least partially solve the technical problems of inflexible video images and unintelligent human-computer interaction in the conventional technology. In addition, an image processing apparatus, an image processing hardware device, a computer readable storage medium and an image processing terminal are also provided.

In order to achieve the above object, according to an aspect of the present disclosure, the following technical solutions are provided.

An image processing method includes:
acquiring a video image, where the video image includes a two-dimensional sticker, and the two-dimensional sticker includes a target area;
performing key point detection on the video image to obtain a preset number of first key points associated with the target area;
acquiring the preset number of second key points that are marked and associated with the target area;
determining a display area of the two-dimensional sticker in the video image according to the preset number of the first key points and the preset number of the second key points; and
rendering the two-dimensional sticker in the display area.

In order to achieve the above object, according to an aspect of the present disclosure, the following technical solutions are provided.

An image processing apparatus includes:
an image acquiring module, configured to acquire a video image, where the video image includes a two-dimensional sticker, and the two-dimensional sticker includes a target area;
a key point detecting module, configured to perform key point detection on the video image to obtain a preset number of first key points associated with the target area;
a key point acquiring module, configured to acquire the preset number of second key points that are marked and associated with the target area;
a display area determining module, configured to determine a display area of the two-dimensional sticker in the video image according to the preset number of the first key points and the preset number of the second key points; and
a sticker display module, configured to render the two-dimensional sticker in the display area.

In order to achieve the above object, according to an aspect of the present disclosure, the following technical solutions are provided.

An electronic device includes:
a memory, storing non-transitory computer readable instructions; and
a processor, configured to execute the computer readable instructions to perform any of the above image processing method.

In order to achieve the above object, according to an aspect of the present disclosure, the following technical solutions are provided.

A computer-readable storage medium stores non-transitory computer readable instructions, where the non-transitory computer readable instructions, when being executed by a computer, cause the computer to perform any of the above image processing method.

In order to achieve the above object, according to an aspect of the present disclosure, the following technical solutions are provided.

An image processing terminal includes any of the above image processing apparatus.

In the embodiments of the present disclosure, by performing key point detection on the video image, a preset number of first key points associated with the target area in the two-dimensional sticker are acquired, and the preset number of second key points that are marked and associated with the target area are acquired. The display area of the two-dimensional sticker in the video image is determined according to the preset number of the first key points and the preset number of the second key points, and the two-dimensional sticker is rendered in the display area. In this way, the display area in the video image can be adaptively adjusted according to the target area of the two-dimensional sticker, so that the video images are more flexible and the human-computer interaction is more intelligent.

The above description is only an overview of the technical solutions of the present disclosure. For better understanding of the technical solutions of the present disclosure and implementing the technical solutions according to the specification, and to make the above and other objectives, features and advantages of the technical solutions in the present disclosure clearer, the detailed description is provided below with reference to preferred embodiments and the accompanying drawings.

BRIEF DESCRIPTION OF THE DRAWINGS

The above and other features, advantages and aspects of various embodiments of the present disclosure will become more clear when taken in conjunction with the accompanying drawings and with reference to the following detailed description. Throughout the drawings, the same or similar reference numbers refer to the same or similar elements. It should be understood that the drawings are schematic and that the units and elements are not necessarily drawn to scale.

DETAILED DESCRIPTION

Figure 1:
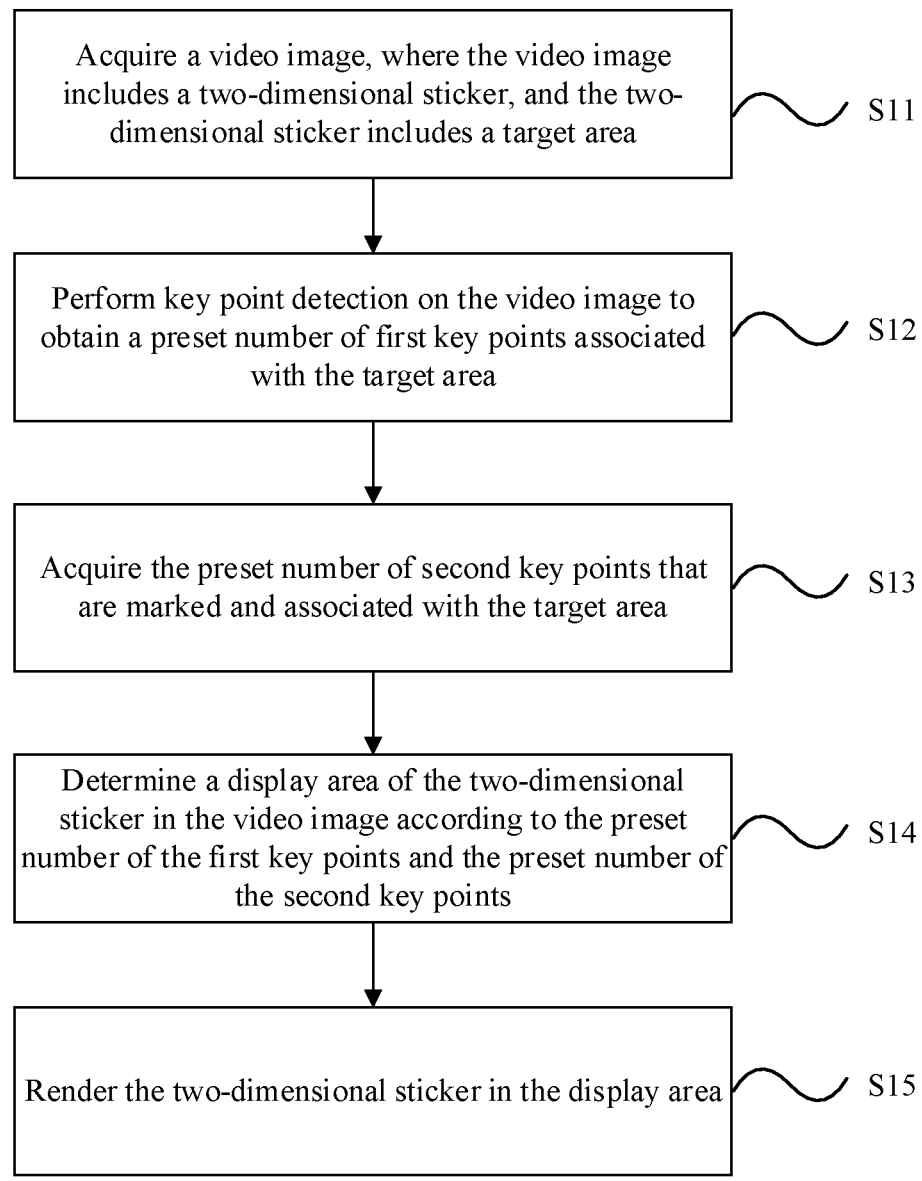
FIG. 1 is a flowchart of an image processing method according to an embodiment of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as being limited to the embodiments set forth herein. The embodiments are provided for a more thorough and complete understanding. It should be understood that the drawings and embodiments of the present disclosure are only provided as examples, and are not intended to limit the protection scope of the present disclosure.

It should be understood that the various steps described in the method embodiments of the present disclosure may be performed in different orders and/or in parallel. Furthermore, method embodiments may include additional steps and/or omit an illustrated step. The scope of the present disclosure is not limited in this regard.

As used herein, the terms "including" and "comprising" and variations thereof are non-exclusive, i.e., meaning "including but not limited to". The term "based on" means "at least partially based on". The term "an embodiment" means "at least one embodiment", the term "another embodiment" means "at least one another embodiment", and the term "some embodiments" means "at least some embodiments". Relevant definitions of other terms will be given in the description below.

First Embodiment

In order to solve the technical problems of inflexible video images and unintelligent human-computer interaction in the conventional technology, embodiments of the present disclosure provide an image processing method. As shown in FIG. 1, the image processing method mainly includes the following steps S11 to S15.

In step S11, a video image is obtained, where the video image includes a two-dimensional sticker, and the two-dimensional sticker includes a target area.

The video image may be a video stream inputted in real time, such as a live video in a short video application, or may be a video image pre-stored in the terminal. The terminal may be a mobile terminal, such as a smart phone or a tablet computer, or a fixed terminal, such as a desktop computer.

The two-dimensional sticker is a wallpaper that a user likes to add to the a video image to make their video more personalized and perfect. For example, the sticker may contain a character (such as a favorite star, a selfie photo, a friends photo, etc.), a beautiful scenery, or a favorite animal. The two-dimensional sticker may be a triangular sticker, a rectangular sticker, a circular sticker, a polygonal sticker, or the like, which is not specifically limited here.

The target area may be set by the user. For example, a person area, a landscape area, or an animal area in the two-dimensional sticker may be selected as the target area. The target area may be a triangular area, a rectangular area, a circular area, a polygonal sticker (a polygon having four or more sides), or the like, which is not specifically limited here.

In step S12, key point detection is performed on the video image to obtain a preset number of first key points associated with the target area.

The preset number may be set by the user, or may be set according to the shape of the target area. For example, if the target area is a triangular area, the preset number is three; if the target area is a rectangular area, the preset number is four; if the target area is a circular area, the preset number is at least three; and if the target area is a polygon area, the preset number is the number of vertices of the polygon area.

The first key point may be a point on the target area, such as a vertex of the target area, or a point on the boundary of the target area, or a point around the target area. The point around the target area has a certain positional relationship with the target area, such as a point adjacent to a vertex of the target area.

In some embodiments, an augmented reality (AR) scan may be used to perform key point detection on the video image to obtain a preset number of first key points associated with the target area. The AR scan may be implemented by any of the following key point detection algorithms: a detection algorithm based on Gaussian Laplacian operator (LOG), a detection algorithm based on pixel point Hessian matrix (second-order differential) and its determinant value (DOH), a scale-invariant feature transformation (SIFT) detection algorithm, a SIFT detection algorithm of speed up robust features (SURF), etc.

In step S13, the preset number of second key points that are marked and associated with the target area are acquired.

The second key points are marked points associated with the target area in the two-dimensional sticker. The number and positions of the second keypoints correspond to those of the first keypoints. For example, if the first key point is a point on the target area, the second key point is also a point on the target area, such as a vertex of the target area, or a point on the boundary of the target area. If the first key point is a point around the target area, the second key point is also a point around the target area, such as a point adjacent to a vertex of the target area.

Specifically, the preset number of second key points associated with the target area in the two-dimensional sticker may be manually pre-marked. The marked second key points are stored in a local database, or sent to a server for storage. The server may be a server corresponding to a short video application. In this step, the second key points are acquired from the local database or a server.

In step S14: a display area of the two-dimensional sticker in the video image is determined according to the preset number of the first key points and the preset number of the second key points.

The shape of the display area corresponds to the shape of the two-dimensional sticker. For example, if the shape of the two-dimensional sticker is a triangle, the display area is a triangle area; if the shape of the two-dimensional sticker is a rectangle, the display area is a rectangle area; if the shape of the two-dimensional sticker is a circle, the display area is a circular area; and if the shape of the two-dimensional sticker is a polygon, the display area is a polygon area, which are not specifically limited here.

In step S15, the two-dimensional sticker is rendered in the display area.

Specifically, in the rendering, various elements (including characters, words and background lights) contained in the two-dimensional sticker are rendered at corresponding positions in the display area.

In this embodiment, by performing key point detection on the video image, a preset number of first key points associated with the target area in the two-dimensional sticker are acquired, and the preset number of second key points that are marked and associated with the target area are acquired. The display area of the two-dimensional sticker in the video image is determined according to the preset number of the first key points and the preset number of the second key points, and the two-dimensional sticker is rendered in the display area. In this way, the display area in the video image can be adaptively adjusted according to the target area of the two-dimensional sticker, so that the video images are more flexible and the human-computer interaction is more intelligent.

In an optional embodiment, step S14 may include the following step S141 to S143.

In step S141, a perspective transformation matrix is determined according to a correspondence between the preset number of the first key points and the preset number of the second key points.

The perspective transformation matrix is a square matrix, and the dimension of the square matrix may be 3.

In step S142, the preset number of third key points corresponding to the two-dimensional stickers are determine in the video image according to the perspective transformation matrix.

The perspective transformation matrix records the correspondence between the marked key points in the two-dimensional sticker and the key points of the two-dimensional sticker detected in the video image. When the marked key points in the two-dimensional sticker are known, The corresponding key points in the video image can be determined according to the perspective transformation matrix.

The preset number may be set by the user, or may be set according to the shape of the two-dimensional sticker. For example, if the two-dimensional sticker has a triangular area, the preset number is three; if the two-dimensional sticker has a rectangular area, the preset number is four; if the two-dimensional sticker has a circular area, the preset number is at least three; and if the two-dimensional sticker has a polygonal area, the preset number is the number of vertices of the polygonal area.

The third key points are points on the two-dimensional sticker, such as vertices of the two-dimensional sticker, or points on the boundary of the two-dimensional sticker.

In step S143, the display area of the two-dimensional sticker in the video image is determined according to the preset number of third key points.

Specifically, the determined preset number of third key points are connected in sequence, and the formed closed area is determined as the display area. The shape of the display area corresponds to the shape of the two-dimensional sticker. For example, if the shape of the two-dimensional sticker is a triangle, the display area is a triangle area; if the shape of the two-dimensional sticker is a rectangle, the display area is a rectangle area; if the shape of the two-dimensional sticker is a circle, the display area is a circular area; and if the shape of the two-dimensional sticker is a polygon, the display area is a polygon area, which are not specifically limited here.

In this embodiment, a perspective transformation matrix is determined according to the corresponding relationship between the preset number of first key points and the preset number of second key points. Then the preset number of third key points corresponding to the two-dimensional sticker are determined in the video image according to the perspective transformation matrix, and the display area of the two-dimensional sticker in the video image is determined according to the preset number of the third key points. In this way, the two-dimensional stickers rendered in the display area may have a three-dimensional effect.

In an optional embodiment, step S141 may include the following steps S1411 to S1416.

In step S1411, a coefficient matrix is constructed according to coordinates of the preset number of the first key points and coordinates of the preset number of the second key points.

The coefficient matrix is a square matrix, and the dimension of the square matrix depends on the preset number.

For example, when the preset number is 4, the coordinates corresponding to the 4 first key points are respectively denoted as (u1,v1), (u2,v2), (u3,v3) and (u4,v4)), and coordinates corresponding to the 4 second key point are denoted as (x1,y1), (x2,y2), (x3,y3) and (x4,y4)). The following coefficient matrix can be constructed:

$$\begin{pmatrix} x_1 & y_1 & 1 & 0 & 0 & 0 & -x_1u_1 & -y_1u_1 \\ 0 & 0 & 0 & x_1 & y_1 & 1 & -x_1v_1 & -y_1v_1 \\ x_2 & y_2 & 1 & 0 & 0 & 0 & -x_2u_2 & -y_2u_2 \\ 0 & 0 & 0 & x_2 & y_2 & 1 & -x_2v_2 & -y_2v_2 \\ x_3 & y_3 & 1 & 0 & 0 & 0 & -x_3u_3 & -y_3u_3 \\ 0 & 0 & 0 & x_3 & y_3 & 1 & -x_3v_3 & -y_3v_3 \\ x_4 & y_4 & 1 & 0 & 0 & 0 & -x_4u_4 & -y_4u_4 \\ 0 & 0 & 0 & x_4 & y_4 & 1 & -x_4v_4 & -y_4v_4 \end{pmatrix}.$$

In step S1412, a first one-dimensional matrix is constructed according to the coordinates of the preset number of the first key points.

For example, the coordinates corresponding to the 4 first key points are (u1,v1), (u2,v2), (u3,v3) and (u4,v4), which are arranged vertically in sequence to obtain the following one-dimensional matrix:

$$\begin{pmatrix} u_1 \\ v_1 \\ u_2 \\ v_2 \\ u_3 \\ v_3 \\ u_4 \\ v_4 \end{pmatrix}$$

In step S1413, the perspective transformation matrix is taken as an unknown matrix, and the perspective transformation matrix is converted into a second one-dimensional matrix.

For example, the perspective transformation matrix may be the following 3*3 square matrix:

$$\begin{pmatrix} m0 & m1 & m2 \\ m3 & m4 & m5 \\ m6 & m7 & 1 \end{pmatrix}$$

where m0, m1, m2, m3, m4, m5, m6, m7 are unknowns, which can be converted into the following one-dimensional matrix:

$$\begin{pmatrix} m_0 \\ m_1 \\ m_2 \\ m_3 \\ m_4 \\ m_5 \\ m_6 \\ m_7 \end{pmatrix}.$$

In step S1414, a first matrix equation is formed according to the coefficient matrix, the first one-dimensional matrix and the second one-dimensional matrix, where the first matrix equation is that the first one-dimensional matrix is equal to the coefficient matrix multiplied by the second one-dimensional matrix.

For example, according to the examples in the above steps, the following first matrix equation can be formed according to the above coefficient matrix, the first one-dimensional matrix, and the second one-dimensional matrix:

$$\begin{pmatrix} u_1 \\ v_1 \\ u_2 \\ v_2 \\ u_3 \\ v_3 \\ u_4 \\ v_4 \end{pmatrix} = \begin{pmatrix} x_1 & y_1 & 1 & 0 & 0 & 0 & -x_1u_1 & -y_iu_1 \\ 0 & 0 & 0 & x_1 & y_1 & 1 & -x_1v_1 & -y_1v_1 \\ x_2 & y_2 & 1 & 0 & 0 & 0 & -x_2u_2 & -y_2u_2 \\ 0 & 0 & 0 & x_2 & y_2 & 1 & -x_2v_2 & -y_2v_2 \\ x_3 & y_3 & 1 & 0 & 0 & 0 & -x_3u_3 & -y_3u_3 \\ 0 & 0 & 0 & x_3 & y_3 & 1 & -x_3v_3 & -y_3v_3 \\ x_4 & y_4 & 1 & 0 & 0 & 0 & -x_4u_4 & -y_4u_4 \\ 0 & 0 & 0 & x_4 & y_4 & 1 & -x_4v_4 & -y_4v_4 \end{pmatrix} \begin{pmatrix} m_0 \\ m_1 \\ m_2 \\ m_3 \\ m_4 \\ m_5 \\ m_6 \\ m_7 \end{pmatrix}.$$

In step S1415, the second one-dimensional matrix is obtained by solving the first matrix equation.

In step S1416, the perspective transformation matrix is determined according to the second one-dimensional matrix.

The second one-dimensional matrix is converted from the perspective transformation matrix. After the second one-dimensional matrix is obtained, the perspective transformation matrix is restored according to the second one-dimensional matrix.

In an optional embodiment, step S1415 specifically includes the following steps A to E.

In step A, the coefficient matrix is decomposed into a product of a first matrix and a second matrix.

For example, denoting the coefficient matrix as A, A can be decomposed as: A=L*U, where L is the first matrix and U is the second matrix.

In sep B, the product of the second matrix and the second one-dimensional matrix is determined as a third matrix.

For example, denoting the third matrix as c, and denoting the second one-dimensional matrix as B, we have c=U*B.

In step C, the first matrix equation is converted into a second matrix equation according to the third matrix, where the second matrix equation is that the first one-dimensional matrix is equal to the first matrix multiplied by the third matrix.

For example, denoting the first one-dimensional matrix as b, the corresponding first matrix equation is A*B=b. Since A=L*U and c=U*B, the second matrix equation is L*c=b.

In step D, the third matrix is obtained by solving the second matrix equation.

In the second matrix equation, since both L and b are known matrices, the third matrix c can be obtained by solving the second matrix equation.

In step E, the second one-dimensional matrix is determined according to the third matrix and the second matrix.

The third matrix c is obtained by solving the second matrix equation in step D. Since c=U*B, and U is a known matrix, the second one-dimensional matrix B is the inverse matrix of U multiplied by c.

In an optional embodiment, step S15 specifically includes the following step S151 and S152.

In step S151, a mapping relationship between pixel points in the display area and pixel points in the two-dimensional sticker is determined.

The pixel point at each pixel position in the display area has a corresponding relationship with a pixel point in the two-dimensional sticker. For example, when the number of pixels in the display area is smaller than the number of pixels in the two-dimensional sticker, a pixel point at one pixel position in the display area corresponds to pixels at multiple adjacent positions in the two-dimensional sticker. For example, the pixel values, that is, the color values, of the pixel points at multiple adjacent positions in the two-dimensional sticker are averaged to obtain the pixel value of the pixel point at the corresponding position in the display area. When the number of pixels in the display area is equal to the number of pixels in the two-dimensional sticker, a pixel point at a pixel position in the display area corresponds to a pixel at a corresponding position in the two-dimensional sticker. When the number of pixels in the display area is more than the number of pixels in the two-dimensional sticker, interpolation is performed on the pixels in the two-dimensional sticker so that the number of the pixels in the two-dimensional sticker is more than or equal to the number of pixels in the display area, and then the correspondence between their pixels is determined.

In step S152, the two-dimensional sticker is rendered in the display area according to the mapping relationship.

In an optional embodiment, step S151 specifically includes the following steps S1511 and S1522.

In step S1511, for each of the pixel points in the display area, a third one-dimensional matrix is constructed for the pixel point in the display area.

Specifically, for a pixel at any position in the display area, the coordinates of the pixel are denoted as (u, v), and it is converted into the following one-dimensional column matrix:

$$\begin{pmatrix} wu \\ wv \\ w \end{pmatrix},$$

where, w=m6x+m7y+1, and (x, y) is the coordinates of the pixel in the two-dimensional sticker.

In step S1512, the product of the third one-dimensional matrix and the inverse matrix of the perspective transformation matrix is calculated as the corresponding pixel point in the two-dimensional sticker.

Since the third one-dimensional matrix is a known matrix, the corresponding pixel points in the two-dimensional sticker can be determined according to the following perspective transformation formula:

$$\begin{pmatrix} wu \\ wv \\ w \end{pmatrix} = \begin{pmatrix} m0 & m1 & m2 \\ m3 & m4 & m5 \\ m6 & m7 & 1 \end{pmatrix} \begin{pmatrix} x \\ y \\ 1 \end{pmatrix}$$

In an optional embodiment, step S152 specifically includes the following steps S1521 and S1522.

In step S1521, for each of the pixel points in the display area, a pixel point in the two-dimensional sticker and corresponding to the pixel point in the display area is determined.

In step S1522, each of the pixel points in the display area is rendered according to a pixel value of the pixel point in the two-dimensional sticker and corresponding to the pixel point in the display area.

Second Embodiment

Figure 2:
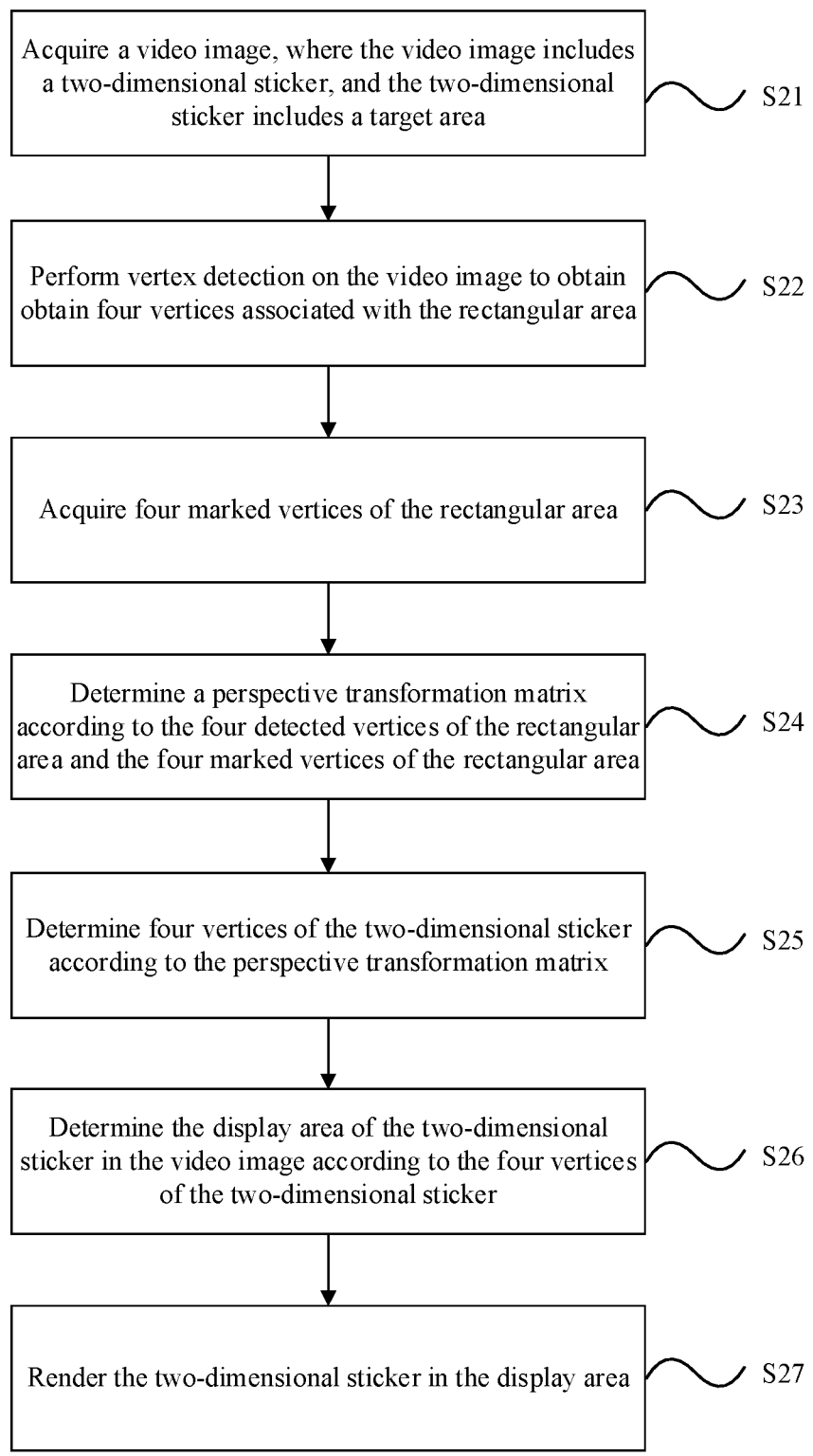
FIG. 2 is a flowchart of an image processing method according to an embodiment of the present disclosure.

This embodiment is a specific implementation. In this embodiment, an example that the two-dimensional sticker is a rectangular sticker and the corresponding key points are vertices is used to explain the technical solution of the present disclosure. As shown in FIG. 2, the image processing method mainly includes the following steps S21 to Step S25.

In step S21, a video image is acquired, where the video image includes a two-dimensional sticker, and the two-dimensional sticker includes a rectangular area.

In step S22, vertex detection is performed on the video image to obtain four vertices associated with the rectangular area.

The closed area formed by the four vertices may be a rectangular area or a quadrilateral area.

In step S23, four marked vertices of the rectangular area are acquired.

In step S24, a perspective transformation matrix is determined according to the four detected vertices of the rectangular area and the four marked vertices of the rectangular area.

Specifically, the coordinates corresponding to the detected four vertices of the rectangular area are denoted as (u1,v1), (u2,v2), (u3,v3) and (u4,v4) respectively, and the coordinates of the four marked vertices of the rectangular area are denoted as (x1, y1), (x2,y2), (x3, y3) and (x4, y4)). The following coefficient matrix can be constructed:

$$\begin{pmatrix} x_1 & y_1 & 1 & 0 & 0 & 0 & -x_1u_1 & -y_1u_1 \\ 0 & 0 & 0 & x_1 & y_1 & 1 & -x_1v_1 & -y_1v_1 \\ x_2 & y_2 & 1 & 0 & 0 & 0 & -x_2u_2 & -y_2u_2 \\ 0 & 0 & 0 & x_2 & y_2 & 1 & -x_2v_2 & -y_2v_2 \\ x_3 & y_3 & 1 & 0 & 0 & 0 & -x_3u_3 & -y_3u_3 \\ 0 & 0 & 0 & x_3 & y_3 & 1 & -x_3v_3 & -y_3v_3 \\ x_4 & y_4 & 1 & 0 & 0 & 0 & -x_4u_4 & -y_4u_4 \\ 0 & 0 & 0 & x_4 & y_4 & 1 & -x_4v_4 & -y_4v_4 \end{pmatrix}$$

Further, the following one-dimensional matrix is obtained according to the coordinates of the detected four vertices of the rectangular area:

$$\begin{pmatrix} u_1 \\ v_1 \\ u_2 \\ v_2 \\ u_3 \\ v_3 \\ u_4 \\ v_4 \end{pmatrix}$$

The perspective transformation matrix is denoted as the following unknown matrix:

$$\begin{pmatrix} m0 & m1 & m2 \\ m3 & m4 & m5 \\ m6 & m7 & 1 \end{pmatrix},$$

which is converted to a one-dimensional matrix as:

$$\begin{pmatrix} m_0 \\ m_1 \\ m_2 \\ m_3 \\ m_4 \\ m_5 \\ m_6 \\ m_7 \end{pmatrix}.$$

The perspective transformation matrix is obtained by solving the following matrix equation:

$$\begin{pmatrix} u_1 \\ v_1 \\ u_2 \\ v_2 \\ u_3 \\ v_3 \\ u_4 \\ v_4 \end{pmatrix} = \begin{pmatrix} x_1 & y_1 & 1 & 0 & 0 & 0 & -x_1u_1 & -y_1u_1 \\ 0 & 0 & 0 & x_1 & y_1 & 1 & -x_1v_1 & -y_1v_1 \\ x_2 & y_2 & 1 & 0 & 0 & 0 & -x_2u_2 & -y_2u_2 \\ 0 & 0 & 0 & x_2 & y_2 & 1 & -x_2v_2 & -y_2v_2 \\ x_3 & y_3 & 1 & 0 & 0 & 0 & -x_3u_3 & -y_3u_3 \\ 0 & 0 & 0 & x_3 & y_3 & 1 & -x_3v_3 & -y_3v_3 \\ x_4 & y_4 & 1 & 0 & 0 & 0 & -x_4u_4 & -y_4u_4 \\ 0 & 0 & 0 & x_4 & y_4 & 1 & -x_4v_4 & -y_4v_4 \end{pmatrix} \begin{pmatrix} m_0 \\ m_1 \\ m_2 \\ m_3 \\ m_4 \\ m_5 \\ m_6 \\ m_7 \end{pmatrix}.$$

The specific solving method is as follows: the coefficient matrix is denoted as A, and the one-dimensional matrix transformed from the perspective transformation matrix is denoted as B, then the metrix equation A*B=b is obtained. Here, A can be decomposed as: A=L*U, then we have L*U*B=b. Denoting c=U*B, we have L*c=b, since L and b are both known matrices, c can be obtained by the solving.

Since c=U*B, and U is a known matrix, B can be calculated as the inverse matrix of U multiplied by c. Then the perspective transformation matrix is restored from b.

In step S25, four vertices of the two-dimensional sticker are determined according to the perspective transformation matrix.

In step S26, the display area of the two-dimensional sticker in the video image is determined according to the four vertices of the two-dimensional sticker.

In step S27, the two-dimensional sticker is rendered in the display area.

For the detailed description of the steps in this embodiment, one may refer to the foregoing embodiment, and details are not repeated here.

Those skilled in the art should understand that, on the basis of the above embodiments, obvious modifications (for example, combining the listed modes) or equivalent substitutions can also be made.

In the above, although the steps in the above method embodiments are described in the above order, it should be understood by those skilled in the art that the steps in the embodiments of the present disclosure are not necessarily executed in the above order, and may be performed in a reverse order, in parallel, in interleaved or in other orders. On the basis of the above steps, those skilled in the art may also add other steps. These obvious modifications or equivalents should also fall in the protection scope of the present disclosure.

The following are device embodiments of the present disclosure. The device embodiments of the present disclosure can be used to execute the steps of the method embodiments of the present disclosure. For the convenience of description, only the parts related to the embodiments of the present disclosure are shown. For the specific technical details not described, one may refer to the method embodiments of the present disclosure.

Third Embodiment

Figure 3:
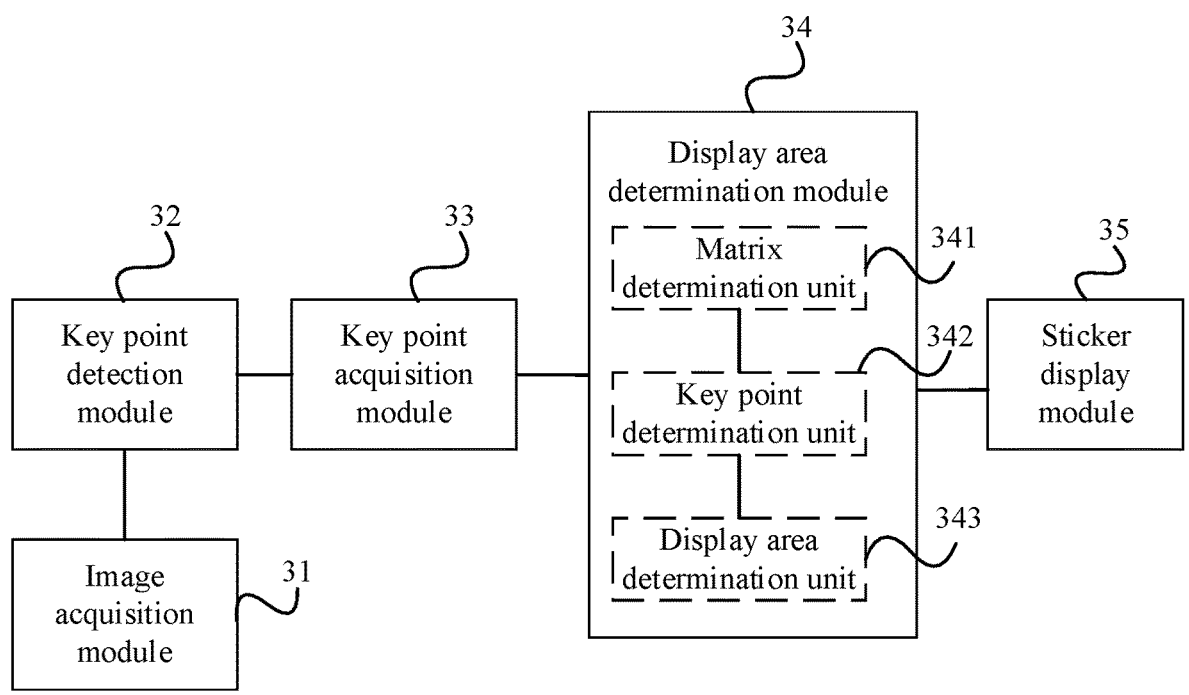
FIG. 3 is a schematic structural diagram of an image processing apparatus according to an embodiment of the present disclosure.

In order to solve the technical problems of inflexible video images and unintelligent human-computer interaction in the conventional technology, embodiments of the present disclosure provide an image processing apparatus. The apparatus may execute the steps in any image processing method described in the first embodiment above. As shown in FIG. 3, the apparatus mainly includes: an image acquisition module 31, a key point detection module 32, a key point acquisition module 33, a display area determination module 34 and a sticker display module 35.

The image acquisition module 31 is used to acquire a video image, where the video image includes a two-dimensional sticker, and the two-dimensional sticker includes a target area.

The key point detection module 32 is configured to perform key point detection on the video image to obtain a preset number of first key points associated with the target area.

The key point acquisition module 33 is configured to the preset number of second key points that are marked and associated with the target area.

The display area determination module 34 is configured to determine a display area of the two-dimensional sticker in the video image according to the preset number of the first key points and the preset number of the second key points.

The sticker display module 35 is configured to render the two-dimensional sticker in the display area.

Further, the display area determination module 34 includes: a matrix determination unit 341, a key point determination unit 342 and a display area determination unit 343.

The matrix determination unit 341 is configured to determine a perspective transformation matrix according to a correspondence between the preset number of the first key points and the preset number of the second key points.

The key point determination unit 342 is configured to determine, in the video image, the preset number of third key points corresponding to the two-dimensional sticker according to the perspective transformation matrix.

The display area determination unit 343 is configured to determine the display area of the two-dimensional sticker in the video image according to the preset number of the third key points.

Further, the matrix determining unit 341 is specifically configured to: construct a coefficient matrix according to coordinates of the preset number of the first key points and coordinates of the preset number of the second key points; construct a first one-dimensional matrix according to the coordinates of the preset number of the first key points; take the perspective transformation matrix as an unknown matrix, and convert the perspective transformation matrix into a second one-dimensional matrix; form a first matrix equation according to the coefficient matrix, the first one-dimensional matrix and the second one-dimensional matrix, where the first matrix equation is that the first one-dimensional matrix is equal to the coefficient matrix multiplied by the second one-dimensional matrix; obtain the second one-dimensional matrix by solving the first matrix equation; and determine the perspective transformation matrix according to the second one-dimensional matrix.

Further, the matrix determination unit 341 is specifically configured to: decompose the coefficient matrix into a product of a first matrix and a second matrix; determine a product of the second matrix and the second one-dimensional matrix as a third matrix; convert the first matrix equation into a second matrix equation according to the third matrix, where the second matrix equation is that the first one-dimensional matrix is equal to the first matrix multiplied by the third matrix; obtain the third matrix by solving the second matrix equation; and determine the second one-dimensional matrix according to the third matrix and the second matrix.

Further, the display area determination unit 343 is specifically configured to: determine a mapping relationship between pixel points in the display area and pixel points in the two-dimensional sticker; and render the two-dimensional sticker in the display area according to the mapping relationship.

Further, the display area determining unit 343 is specifically configured to: construct, for each of the pixel points in the display area, a third one-dimensional matrix for the pixel point in the display area; and determine a pixel point in the two-dimensional sticker and corresponding to the pixel point in the display area as a product of the third one-dimensional matrix and an inverse matrix of the perspective transformation matrix.

Further, the display area determination unit 343 is specifically configured to: determine, for each of the pixel points in the display area, a pixel point in the two-dimensional sticker and corresponding to the pixel point in the display area; and render each of the pixel points in the display area according to a pixel value of the pixel point in the two-dimensional sticker and corresponding to the pixel point in the display area.

Further, the preset number of the first key points associated with the target area are four detected vertices of the target area, and the preset number of the second key points associated with the target area are four marked vertices of the target area.

Fourth Embodiment

Figure 4:
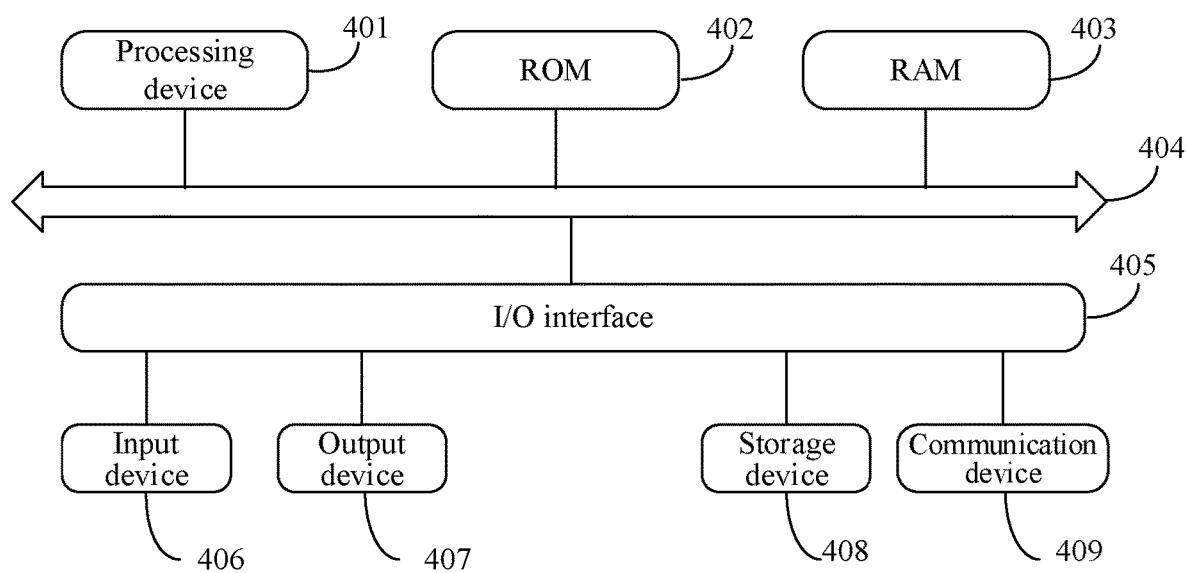
FIG. 4 is a schematic structural diagram of an electronic device according to an embodiment of the present disclosure.

FIG. 4 shows a schematic structural diagram of an electronic device 400 suitable for implementing the embodiments of the present disclosure. Terminal devices in the embodiments of the present disclosure may include, but are not limited to, mobile terminals, such as mobile phones, notebook computers, digital broadcast receivers, PDAs (Personal Digital Assistants), PADs (Tablet computers), PMPs (Portable Multimedia Players), vehicle-mounted terminals (such as in-vehicle navigation terminals), and the like, and fixed terminals such as digital TVs, desktop computers, and the like. The electronic device shown in FIG. 4 is only an example, and should not impose any limitation on the functions and applications of the embodiments of the present disclosure.

As shown in FIG. 4, the electronic device 400 may include a processing device (such as a central processing unit, a graphics processor) 401 that may execute various appropriate actions and processes according to a program stored in a read only memory (ROM) 402 or loaded into random access memory (RAM) 403 from a storage device 406. In the RAM 403, various programs and data necessary for the operation of the electronic device 400 are also stored. The processing device 401, the ROM 402, and the RAM 403 are connected to each other through a bus 404. An input/output (I/O) interface 405 is also connected to the bus 404.

Normally, the following devices may be connected to the I/O interface 405: an input device 406 such as a touch screen, a touchpad, a keyboard, a mouse, a camera, a microphone, an accelerometer, a gyroscope and the like; an output device 407, such as a liquid crystal display (LCD), a speaker, a vibrator and the like; a storage device 406, such as a magnetic tape, a hard disk and the like; and a communication device 409. The communication device 409 may enable the electronic device 400 to communicate in a wireless or wired manner with other devices to exchange data. Although FIG. 4 shows the electronic device 400 having various means, it should be understood that not all of the illustrated means are required to be implemented or provided. More or fewer devices may alternatively be implemented or provided.

In particular, according to embodiments of the present disclosure, the processes described above with reference to the flowcharts may be implemented as computer software programs. For example, embodiments of the present disclosure include a computer program product including a computer program carried on a non-transitory computer readable medium. The computer program includes program code for performing the method illustrated in the flowchart. In such an embodiment, the computer program may be downloaded and installed from the network via the communication device 409, or from the storage device 406, or from the ROM 402. When the computer program is executed by the processing device 401, the above-mentioned functions in the methods of the embodiments of the present disclosure are executed.

It should be noted that the computer-readable medium mentioned above in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus or device, or any combination thereof. More specific examples of computer readable storage media may include, but are not limited to, electrical connections with one or more wires, portable computer disks, hard disks, a random access memory (RAM), a read only memory (ROM), an erasable Programmable read only memory (EPROM or flash memory), a optical fiber, a portable compact disk read only memory (CD-ROM), optical storage devices, magnetic storage devices, or any suitable combination thereof. In this disclosure, a computer-readable storage medium may be any tangible medium that contains or stores a program that can be used by or in conjunction with an instruction execution system, apparatus or device. In the present disclosure, a computer-readable signal medium may include a data signal propagated in baseband or as part of a carrier wave with computer-readable program code embodied thereon. Such propagated data signals may be in a variety of forms, including but not limited to electromagnetic signals, optical signals, or any suitable combination thereof. A computer-readable signal medium can also be any computer-readable medium other than a computer-readable storage medium that can transmit, propagate, or transport the program for use by or in connection with the instruction execution system, apparatus or device. Program code stored on a computer readable medium may be transmitted using any suitable medium including, but not limited to, an electrical wire, an optical fiber cable, RF (radio frequency), or any suitable combination thereof.

In some embodiments, the client and server may use any currently known or future network protocol such as HTTP (HyperText Transfer Protocol) to communicate, and may be connected with digital data network in any form or medium (such as a communication network). Examples of communication networks include local area networks (LAN), wide area networks (WAN), the Internet (eg, the Internet), and peer-to-peer networks (such as ad hoc peer-to-peer networks), as well as any current or future network.

The above-mentioned computer-readable medium may be included in the above-mentioned electronic device, or may exist alone without being assembled into the electronic device.

The above-mentioned computer-readable medium carries one or more programs. The above-mentioned one or more programs, when being executed by the electronic device, cause the electronic device to: acquire a video image, where the video image includes a two-dimensional sticker, and the two-dimensional sticker includes a target area; perform key point detection on the video image to obtain a preset number of first key points associated with the target area; acquire the preset number of second key points that are marked and associated with the target area; determine a display area of the two-dimensional sticker in the video image according to the preset number of the first key points and the preset number of the second key points; and render the two-dimensional sticker in the display area.

Computer program code for performing operations of the present disclosure may be written in one or more programming languages, including but not limited to object-oriented programming languages, such as Java, Smalltalk, C++, and conventional procedural programming languages, such as the "C" language or similar programming languages. The program code may be executed entirely on a user computer, or partly on a user computer, or as a stand-alone software package, or partly on a user computer and partly on a remote computer, or entirely on a remote computer or server. In the case of using a remote computer, the remote computer may be connected to the user's computer through any kind of network, including a local area network (LAN) or a wide area network (WAN), or may be connected to an external computer (eg, using Internet connection provided by an Internet service provider).

The flowchart and block diagrams in the Figures illustrate the architecture, functionality, and operations of possible implementations of systems, methods and computer program products according to various embodiments of the present disclosure. In this regard, each block in the flowcharts or block diagrams may represent a module, program segment, or a portion of code that contains one or more executable instructions for implementing the specified logical functions. It should also be noted that, in some alternative implementations, the functions noted in the blocks may occur in an order other than the order shown in the figures. For example, two blocks shown in succession may be executed substantially concurrently, or the blocks may sometimes be executed in the reverse order, depending upon the functionality involved. It is also noted that each block of the block diagrams and/or flowchart illustrations, and combinations of blocks in the block diagrams and/or flowchart illustrations, may be implemented in dedicated hardware-based systems that perform the specified functions or operations, or may be implemented by a combination of dedicated hardware and computer instructions.

The units involved in the embodiments of the present disclosure may be implemented in a software manner, or in a hardware manner. The name of the unit does not constitute a limitation of the unit under any circumstances. For example, the first acquisition unit may also be described as "a unit for acquiring at least two internet protocol addresses".

The functions described above may be performed, at least in part, by one or more hardware logic components. For example, without limitation, examples of hardware logic components that may be used include: a Field Programmable Gate Array (FPGA), a Application Specific Integrated Circuit (ASIC), an Application Specific Standard Product (ASSP), a System on Chip (SOC), a Complex Programmable Logical Device (CPLD) and the like.

In the present disclosure, a machine-readable medium may be a tangible medium that may contain or store a program for use by or in connection with the instruction execution system, apparatus or device. The machine-readable medium may be a machine-readable signal medium or a machine-readable storage medium. Machine-readable media may include, but are not limited to, electronic, magnetic, optical, electromagnetic, infrared, or semiconductor systems, devices, or devices, or any suitable combination thereof. More specific examples of machine-readable storage media include one or more wire-based electrical connections, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination thereof.

According to one or more embodiments of the present disclosure, an image processing method is provided, including:
    acquiring a video image, where the video image includes a two-dimensional sticker, and the two-dimensional sticker includes a target area;
    performing key point detection on the video image to obtain a preset number of first key points associated with the target area;
    acquiring the preset number of second key points that are marked and associated with the target area;
    determining a display area of the two-dimensional sticker in the video image according to the preset number of the first key points and the preset number of the second key points; and
    rendering the two-dimensional sticker in the display area.

Further, the determining a display area of the two-dimensional sticker in the video image according to the preset number of the first key points and the preset number of the second key points includes:
    determining a perspective transformation matrix according to a correspondence between the preset number of the first key points and the preset number of the second key points;
    determining, in the video image, the preset number of third key points corresponding to the two-dimensional sticker according to the perspective transformation matrix; and
    determining the display area of the two-dimensional sticker in the video image according to the preset number of the third key points.

Further, the determining a perspective transformation matrix according to a correspondence between the preset number of the first key points and the preset number of the second key points includes:
    constructing a coefficient matrix according to coordinates of the preset number of the first key points and coordinates of the preset number of the second key points;
    constructing a first one-dimensional matrix according to the coordinates of the preset number of the first key points;
    taking the perspective transformation matrix as an unknown matrix, and converting the perspective transformation matrix into a second one-dimensional matrix;
    forming a first matrix equation according to the coefficient matrix, the first one-dimensional matrix and the second one-dimensional matrix, where the first matrix equation is that the first one-dimensional matrix is equal to the coefficient matrix multiplied by the second one-dimensional matrix;
    obtaining the second one-dimensional matrix by solving the first matrix equation; and
    determining the perspective transformation matrix according to the second one-dimensional matrix.

Further, the obtaining the second one-dimensional matrix by solving the first matrix equation includes:
    decomposing the coefficient matrix into a product of a first matrix and a second matrix;
    determining a product of the second matrix and the second one-dimensional matrix as a third matrix;
    converting the first matrix equation into a second matrix equation according to the third matrix, where the second matrix equation is that the first one-dimensional matrix is equal to the first matrix multiplied by the third matrix;
    obtaining the third matrix by solving the second matrix equation; and
    determining the second one-dimensional matrix according to the third matrix and the second matrix.

Further, the rendering the two-dimensional sticker in the display area includes:
    determining a mapping relationship between pixel points in the display area and pixel points in the two-dimensional sticker; and
    rendering the two-dimensional sticker in the display area according to the mapping relationship.

Further, the determining a mapping relationship between pixel points in the display area and pixel points in the two-dimensional sticker includes:
    constructing, for each of the pixel points in the display area, a third one-dimensional matrix for the pixel point in the display area; and
    determining a pixel point in the two-dimensional sticker and corresponding to the pixel point in the display area as a product of the third one-dimensional matrix and an inverse matrix of the perspective transformation matrix.

Further, the rendering the two-dimensional sticker in the display area according to the mapping relationship includes:

determining, for each of the pixel points in the display area, a pixel point in the two-dimensional sticker and corresponding to the pixel point in the display area; and rendering each of the pixel points in the display area according to a pixel value of the pixel point in the two-dimensional sticker and corresponding to the pixel point in the display area.

Further, the preset number of the first key points associated with the target area are four detected vertices of the target area, and the preset number of the second key points associated with the target area are four marked vertices of the target area.

According to one or more embodiments of the present disclosure, an image processing apparatus is provided, including:

an image acquisition module, configured to acquire a video image, where the video image includes a two-dimensional sticker, and the two-dimensional sticker includes a target area;

a key point detection module, configured to perform key point detection on the video image to obtain a preset number of first key points associated with the target area;

a key point acquisition module, configured to acquire the preset number of second key points that are marked and associated with the target area;

a display area determination module, configured to determine a display area of the two-dimensional sticker in the video image according to the preset number of the first key points and the preset number of the second key points; and a sticker display module, configured to render the two-dimensional sticker in the display area.

Further, the display area determination module 34 includes:

a matrix determination unit, configured to determine a perspective transformation matrix according to a correspondence between the preset number of the first key points and the preset number of the second key points;

a key point determination unit, configured to determine, in the video image, the preset number of third key points corresponding to the two-dimensional sticker according to the perspective transformation matrix; and a display area determination unit, configured to determine the display area of the two-dimensional sticker in the video image according to the preset number of the third key points.

Further, the matrix determining unit is specifically configured to: construct a coefficient matrix according to coordinates of the preset number of the first key points and coordinates of the preset number of the second key points; construct a first one-dimensional matrix according to the coordinates of the preset number of the first key points; take the perspective transformation matrix as an unknown matrix, and convert the perspective transformation matrix into a second one-dimensional matrix; form a first matrix equation according to the coefficient matrix, the first one-dimensional matrix and the second one-dimensional matrix, where the first matrix equation is that the first one-dimensional matrix is equal to the coefficient matrix multiplied by the second one-dimensional matrix; obtain the second one-dimensional matrix by solving the first matrix equation; and determine the perspective transformation matrix according to the second one-dimensional matrix.

Further, the matrix determination unit is specifically configured to: decompose the coefficient matrix into a product of a first matrix and a second matrix; determine a product of the second matrix and the second one-dimensional matrix as a third matrix; convert the first matrix equation into a second matrix equation according to the third matrix, where the second matrix equation is that the first one-dimensional matrix is equal to the first matrix multiplied by the third matrix; obtain the third matrix by solving the second matrix equation; and determine the second one-dimensional matrix according to the third matrix and the second matrix.

Further, the display area determination unit is specifically configured to: determine a mapping relationship between pixel points in the display area and pixel points in the two-dimensional sticker; and render the two-dimensional sticker in the display area according to the mapping relationship.

Further, the display area determining unit is specifically configured to: construct, for each of the pixel points in the display area, a third one-dimensional matrix for the pixel point in the display area; and determine a pixel point in the two-dimensional sticker and corresponding to the pixel point in the display area as a product of the third one-dimensional matrix and an inverse matrix of the perspective transformation matrix.

Further, the display area determination unit is specifically configured to: determine, for each of the pixel points in the display area, a pixel point in the two-dimensional sticker and corresponding to the pixel point in the display area; and render each of the pixel points in the display area according to a pixel value of the pixel point in the two-dimensional sticker and corresponding to the pixel point in the display area.

Further, the preset number of the first key points associated with the target area are four detected vertices of the target area, and the preset number of the second key points associated with the target area are four marked vertices of the target area.

According to one or more embodiments of the present disclosure, an electronic device is provided, including:

a memory, storing non-transitory computer readable instructions; and a processor, configured to execute the computer readable instructions to perform the above image processing method.

According to one or more embodiments of the present disclosure, an electronic device is provided, including a computer-readable storage medium, storing non-transitory computer readable instructions, where the non-transitory computer readable instructions, when being executed by a computer, cause the computer to perform the above image processing method.

The above merely describes preferred embodiments of the present disclosure and illustrates the technical principles. Those skilled in the art should understand that the scope of the disclosure is not limited to the technical solutions formed by the specific combination of the above-mentioned technical features, and should also cover, without departing from the above disclosed concept, the technical solutions formed by any combination of the above-mentioned technical features or other equivalent features. For example, a technical solution may be formed by replacing a feature with another feature having similar function disclosed in the present disclosure (but not limited to).

Additionally, although operations are described in a particular order, this should not be construed as requiring that the operations to be performed in the particular order shown or in a sequential order. Under certain circumstances, multitasking and parallel processing may be advantageous. Similarly, although the above description contains several implementation details, these should not be construed as limitations on the scope of the present disclosure. Some features that are described in different embodiments may also be implemented in a same embodiment. Also, various features that are described in a single embodiment may be implemented in multiple embodiments separately or in any suitable subcombination.

Although the subject matter has been described in language specific to structural features and/or logical acts, it is to be understood that the subject matter defined in the appended claims is not necessarily limited to the specific features or acts described above. Rather, the specific features and acts described above are merely examples for implementing the claims.

What is claimed is:

1. An image processing method, comprising:
acquiring a video image, wherein the video image comprises a two-dimensional sticker, and the two-dimensional sticker comprises a target area;
performing key point detection on the video image to obtain a preset number of first key points associated with the target area;
acquiring the preset number of second key points that are marked and associated with the target area;
determining a display area of the two-dimensional sticker in the video image according to the preset number of the first key points and the preset number of the second key points; and
rendering the two-dimensional sticker in the display area, wherein the rendering the two-dimensional sticker in the display area comprises:
determining a mapping relationship between pixel points in the display area and pixel points in the two-dimensional sticker, and
rendering the two-dimensional sticker in the display area according to the mapping relationship, wherein the rendering the two-dimensional sticker in the display area according to the mapping relationship comprises:
determining, for each of the pixel points in the display area, a pixel point in the two-dimensional sticker and corresponding to the pixel point in the display area, and
rendering each of the pixel points in the display area according to a pixel value of the pixel point in the two-dimensional sticker and corresponding to the pixel point in the display area.

2. The method according to claim 1, wherein the determining a display area of the two-dimensional sticker in the video image according to the preset number of the first key points and the preset number of the second key points comprises:
determining a perspective transformation matrix according to a correspondence between the preset number of the first key points and the preset number of the second key points;
determining, in the video image, the preset number of third key points corresponding to the two-dimensional sticker according to the perspective transformation matrix; and
determining the display area of the two-dimensional sticker in the video image according to the preset number of the third key points.

3. The method according to claim 2, wherein the determining a perspective transformation matrix according to a correspondence between the preset number of the first key points and the preset number of the second key points comprises:
constructing a coefficient matrix according to coordinates of the preset number of the first key points and coordinates of the preset number of the second key points;
constructing a first one-dimensional matrix according to the coordinates of the preset number of the first key points;
taking the perspective transformation matrix as an unknown matrix, and converting the perspective transformation matrix into a second one-dimensional matrix;
forming a first matrix equation according to the coefficient matrix, the first one-dimensional matrix and the second one-dimensional matrix, wherein the first matrix equation is that the first one-dimensional matrix is equal to the coefficient matrix multiplied by the second one-dimensional matrix;
obtaining the second one-dimensional matrix by solving the first matrix equation; and
determining the perspective transformation matrix according to the second one-dimensional matrix.

4. The method according to claim 3, wherein the obtaining the second one-dimensional matrix by solving the first matrix equation comprises:
decomposing the coefficient matrix into a product of a first matrix and a second matrix;
determining a product of the second matrix and the second one-dimensional matrix as a third matrix;
converting the first matrix equation into a second matrix equation according to the third matrix, wherein the second matrix equation is that the first one-dimensional matrix is equal to the first matrix multiplied by the third matrix;
obtaining the third matrix by solving the second matrix equation; and
determining the second one-dimensional matrix according to the third matrix and the second matrix.

5. The method according to claim 1, wherein the determining a mapping relationship between pixel points in the display area and pixel points in the two-dimensional sticker comprises:
constructing, for each of the pixel points in the display area, a third one-dimensional matrix for the pixel point in the display area; and
determining a pixel point in the two-dimensional sticker and corresponding to the pixel point in the display area as a product of the third one-dimensional matrix and an inverse matrix of the perspective transformation matrix.

6. The method according to claim 1, wherein the preset number of the first key points associated with the target area are four detected vertices of the target area, and the preset number of the second key points associated with the target area are four marked vertices of the target area.

7. An image processing apparatus, comprising:
at least one processor; and
at least one memory communicatively coupled to the at least one processor and storing instructions that upon execution by the at least one processor cause the apparatus to:
acquire a video image, wherein the video image comprises a two-dimensional sticker, and the two-dimensional sticker comprises a target area;

perform key point detection on the video image to obtain a preset number of first key points associated with the target area;

acquire the preset number of second key points that are marked and associated with the target area;

determine a display area of the two-dimensional sticker in the video image according to the preset number of the first key points and the preset number of the second key points; and render the two-dimensional sticker in the display area, wherein rendering the two-dimensional sticker in the display area comprises:

determining a mapping relationship between pixel points in the display area and pixel points in the two-dimensional sticker, and rendering the two-dimensional sticker in the display area according to the mapping relationship, wherein the rendering the two-dimensional sticker in the display area according to the mapping relationship comprises:

determining, for each of the pixel points in the display area, a pixel point in the two-dimensional sticker and corresponding to the pixel point in the display area, and rendering each of the pixel points in the display area according to a pixel value of the pixel point in the two-dimensional sticker and corresponding to the pixel point in the display area.

8. A non-transitory computer-readable storage medium, storing non-transitory computer readable instructions, wherein the non-transitory computer readable instructions, when being executed by a computer, cause the computer to:

acquire a video image, wherein the video image comprises a two-dimensional sticker, and the two-dimensional sticker comprises a target area;

perform key point detection on the video image to obtain a preset number of first key points associated with the target area;

acquire the preset number of second key points that are marked and associated with the target area;

determine a display area of the two-dimensional sticker in the video image according to the preset number of the first key points and the preset number of the second key points; and render the two-dimensional sticker in the display area, wherein rendering the two-dimensional sticker in the display area comprises:

determining a mapping relationship between pixel points in the display area and pixel points in the two-dimensional sticker, and rendering the two-dimensional sticker in the display area according to the mapping relationship, wherein the rendering the two-dimensional sticker in the display area according to the mapping relationship comprises:

determining, for each of the pixel points in the display area, a pixel point in the two-dimensional sticker and corresponding to the pixel point in the display area, and rendering each of the pixel points in the display area according to a pixel value of the pixel point in the two-dimensional sticker and corresponding to the pixel point in the display area.

9. The apparatus of claim 7, the at least one memory further storing instructions that upon execution by the at least one processor cause the apparatus to:

determine a perspective transformation matrix according to a correspondence between the preset number of the first key points and the preset number of the second key points;

determine, in the video image, the preset number of third key points corresponding to the two-dimensional sticker according to the perspective transformation matrix; and determine the display area of the two-dimensional sticker in the video image according to the preset number of the third key points.

10. The apparatus of claim 9, the at least one memory further storing instructions that upon execution by the at least one processor cause the apparatus to:

construct a coefficient matrix according to coordinates of the preset number of the first key points and coordinates of the preset number of the second key points;

construct a first one-dimensional matrix according to the coordinates of the preset number of the first key points;

take the perspective transformation matrix as an unknown matrix, and converting the perspective transformation matrix into a second one-dimensional matrix;

form a first matrix equation according to the coefficient matrix, the first one-dimensional matrix and the second one-dimensional matrix, wherein the first matrix equation is that the first one-dimensional matrix is equal to the coefficient matrix multiplied by the second one-dimensional matrix;

obtain the second one-dimensional matrix by solving the first matrix equation; and determine the perspective transformation matrix according to the second one-dimensional matrix.

11. The apparatus of claim 10, the at least one memory further storing instructions that upon execution by the at least one processor cause the apparatus to:

decompose the coefficient matrix into a product of a first matrix and a second matrix;

determine a product of the second matrix and the second one-dimensional matrix as a third matrix;

convert the first matrix equation into a second matrix equation according to the third matrix, wherein the second matrix equation is that the first one-dimensional matrix is equal to the first matrix multiplied by the third matrix;

obtain the third matrix by solving the second matrix equation; and determine the second one-dimensional matrix according to the third matrix and the second matrix.

12. The apparatus of claim 7, the at least one memory further storing instructions that upon execution by the at least one processor cause the apparatus to:

construct, for each of the pixel points in the display area, a third one-dimensional matrix for the pixel point in the display area; and determine a pixel point in the two-dimensional sticker and corresponding to the pixel point in the display area as a product of the third one-dimensional matrix and an inverse matrix of the perspective transformation matrix.

13. The apparatus of claim 7, wherein the preset number of the first key points associated with the target area are four detected vertices of the target area, and the preset number of the second key points associated with the target area are four marked vertices of the target area.

14. The non-transitory computer-readable storage medium of claim 8, wherein determining a display area of the two-dimensional sticker in the video image according to the preset number of the first key points and the preset number of the second key points comprises:
- determining a perspective transformation matrix according to a correspondence between the preset number of the first key points and the preset number of the second key points;
- determining, in the video image, the preset number of third key points corresponding to the two-dimensional sticker according to the perspective transformation matrix; and
- determining the display area of the two-dimensional sticker in the video image according to the preset number of the third key points.

15. The non-transitory computer-readable storage medium of claim 14, wherein the determining a perspective transformation matrix according to a correspondence between the preset number of the first key points and the preset number of the second key points comprises:
- constructing a coefficient matrix according to coordinates of the preset number of the first key points and coordinates of the preset number of the second key points;
- constructing a first one-dimensional matrix according to the coordinates of the preset number of the first key points;
- taking the perspective transformation matrix as an unknown matrix, and converting the perspective transformation matrix into a second one-dimensional matrix;
- forming a first matrix equation according to the coefficient matrix, the first one-dimensional matrix and the second one-dimensional matrix, wherein the first matrix equation is that the first one-dimensional matrix is equal to the coefficient matrix multiplied by the second one-dimensional matrix;
- obtaining the second one-dimensional matrix by solving the first matrix equation; and
- determining the perspective transformation matrix according to the second one-dimensional matrix.

16. The non-transitory computer-readable storage medium of claim 15, wherein the obtaining the second one-dimensional matrix by solving the first matrix equation comprises:
- decomposing the coefficient matrix into a product of a first matrix and a second matrix;
- determining a product of the second matrix and the second one-dimensional matrix as a third matrix;
- converting the first matrix equation into a second matrix equation according to the third matrix, wherein the second matrix equation is that the first one-dimensional matrix is equal to the first matrix multiplied by the third matrix;
- obtaining the third matrix by solving the second matrix equation; and
- determining the second one-dimensional matrix according to the third matrix and the second matrix.

17. The non-transitory computer-readable storage medium of claim 8, wherein the determining a mapping relationship between pixel points in the display area and pixel points in the two-dimensional sticker comprises:
- constructing, for each of the pixel points in the display area, a third one-dimensional matrix for the pixel point in the display area; and
- determining a pixel point in the two-dimensional sticker and corresponding to the pixel point in the display area as a product of the third one-dimensional matrix and an inverse matrix of the perspective transformation matrix.

18. The non-transitory computer-readable storage medium of claim 8, wherein the preset number of the first key points associated with the target area are four detected vertices of the target area, and the preset number of the second key points associated with the target area are four marked vertices of the target area.

* * * * *